US010773720B2

(12) United States Patent
Books et al.

(10) Patent No.: US 10,773,720 B2
(45) Date of Patent: Sep. 15, 2020

(54) COMMUNICATION INTERFACE FOR START-STOP SYSTEMS AND METHODS

(71) Applicant: Cummins, Inc., Columbus, IN (US)

(72) Inventors: Martin T. Books, Columbus, IN (US); John P. O'Brien, Oakham (GB); Praveen C. Muralidhar, Indianapolis, IN (US); Jaideep Prasad, Columbus, IN (US); Randal L. Bergstedt, Columbus, IN (US); Ian N. Alsman, Columbus, IN (US); Jagdeep I. Singh, Columbus, IN (US); Rajan S. Kalirai, Indianapolis, IN (US); Rima Salve, Columbus, IN (US); Jeffrey S. Rauch, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 16/138,694

(22) Filed: Sep. 21, 2018

(65) Prior Publication Data

US 2019/0023272 A1   Jan. 24, 2019

Related U.S. Application Data

(63) Continuation of application No. 15/222,120, filed on Jul. 28, 2016, now Pat. No. 10,081,361.

(Continued)

(30) Foreign Application Priority Data

Jun. 29, 2016   (GB) .................................. 1611271.6

(51) Int. Cl.
*B60W 10/06*   (2006.01)
*B60W 30/18*   (2012.01)
(Continued)

(52) U.S. Cl.
CPC ......... *B60W 30/18018* (2013.01); *B60K 6/20* (2013.01); *B60K 6/48* (2013.01);
(Continued)

(58) Field of Classification Search
CPC ........... B60W 30/18018; B60W 20/00; B60W 10/06; B60R 16/0236; B60R 6/20;
(Continued)

(56) References Cited

U.S. PATENT DOCUMENTS 6,760,659 B1   7/2004   Cowen
7,115,068 B2   10/2006   Braun et al.
(Continued)

FOREIGN PATENT DOCUMENTS

CN   103287361 A   9/2013
CN   103775265 A   5/2014
(Continued)

OTHER PUBLICATIONS

Search report issued for United Kingdom Patent Application No. GB 1611271.6, dated Jun. 29, 2017, 5 pages.

*Primary Examiner* — Anne Marie Antonucci
(74) *Attorney, Agent, or Firm* — Foley & Lardner LLP

(57) ABSTRACT

Systems and methods for implementing a start-stop feature on a vehicle powered at least in party by an internal combustion engine are described. The method includes receiving, at an electronic control unit ("ECU") of the vehicle, an indication that the vehicle is in line at a drive-thru. The method further includes determining, by the ECU, a number of start-stop events anticipated during the drive-thru. The method includes determining, by the ECU, an approximate stop time for each of the number of start-stop events. The method further includes determining, by the ECU, that a battery of the vehicle has enough remaining charge to power a plurality of vehicle components during (Continued)

implementation of the start-stop feature. The method includes implementing, by the ECU, the start-stop feature in which the internal combustion engine is turned off for at least a portion of the time when the vehicle is stopped.

18 Claims, 11 Drawing Sheets

Related U.S. Application Data

(60) Provisional application No. 62/276,637, filed on Jan. 8, 2016.

(51) Int. Cl.

| | | |
|---|---|---|
| *B60W 20/00* | (2016.01) | |
| *B60R 16/023* | (2006.01) | |
| *B62D 15/02* | (2006.01) | |
| *B60R 16/03* | (2006.01) | |
| *B60K 6/20* | (2007.10) | |
| *B60K 6/48* | (2007.10) | |
| *F02N 11/08* | (2006.01) | |

(52) U.S. Cl.
CPC .......... *B60R 16/0236* (2013.01); *B60R 16/03* (2013.01); *B60W 10/06* (2013.01); *B60W 20/00* (2013.01); *B62D 15/021* (2013.01); *F02N 11/084* (2013.01); *B60W 2300/17* (2013.01); *F02N 2200/061* (2013.01); *F02N 2200/0809* (2013.01); *F02N 2300/2006* (2013.01)

(58) Field of Classification Search
CPC ....... F02N 2200/061; F02N 2200/0809; F02N 2300/2006; F02N 11/084; F02N 11/0814
See application file for complete search history.

(56) References Cited

U.S. PATENT DOCUMENTS

| | | |
|---|---|---|
| 7,874,883 B2 | 1/2011 | Rui |
| 8,666,594 B2 | 3/2014 | Aimo Boot |
| 8,708,090 B2 | 4/2014 | Boot |
| 8,788,178 B2 | 7/2014 | Pebley et al. |
| 8,845,490 B2 | 9/2014 | Chan et al. |
| 2006/0116797 A1 | 6/2006 | Moran |
| 2007/0124037 A1 | 5/2007 | Moran |
| 2009/0132118 A1 | 5/2009 | Takeda |
| 2010/0131152 A1 | 5/2010 | Castonguay et al. |
| 2011/0017533 A1 | 1/2011 | Bissontz |
| 2011/0106413 A1 | 5/2011 | Park et al. |
| 2013/0158838 A1 | 6/2013 | Yorke et al. |
| 2013/0231848 A1 | 9/2013 | Roberts et al. |
| 2014/0081561 A1* | 3/2014 | Be .................. F02N 11/0822 701/112 |
| 2014/0121865 A1* | 5/2014 | Anderson .......... B60W 50/029 701/22 |
| 2014/0158235 A1 | 6/2014 | Suk et al. |
| 2014/0278019 A1 | 9/2014 | Be et al. |
| 2014/0373666 A1 | 12/2014 | Gulati et al. |
| 2015/0219056 A1 | 8/2015 | Boesch |
| 2016/0369733 A1 | 12/2016 | Dokras et al. |

FOREIGN PATENT DOCUMENTS

| | | |
|---|---|---|
| CN | 104553795 A | 4/2015 |
| CN | 104712448 A | 6/2015 |
| DE | 10 2010 020 066 | 11/2011 |
| GB | 2 277 425 A | 10/1994 |
| GB | 2 515 774 | 1/2015 |
| WO | WO-2015/033131 A1 | 3/2015 |

\* cited by examiner

COMMUNICATION INTERFACE FOR START-STOP SYSTEMS AND METHODS

CROSS-REFERENCE TO RELATED APPLICATIONS

The present application is a continuation of U.S. patent application Ser. No. 15/222,120, filed Jul. 28, 2016, which claims the benefit of United Kingdom Application No. 1611271.6, filed Jun. 29, 2016, and U.S. Provisional Patent Application No. 62/276,637, filed Jan. 8, 2016. The contents of these applications are incorporated herein by reference in their entirety.

TECHNICAL FIELD

The present invention relates generally to automatically stopping and starting an internal combustion engine of a vehicle.

BACKGROUND

Many vehicles are powered by internal combustion engines. The internal combustion engines burn fuel to power the vehicle. The vehicle may be an automobile, a commercial truck, a military vehicle, a construction vehicle, construction equipment, and the like. Often, the internal combustion engines remain on in an idle operating state even when a vehicle is not moving (e.g., when a vehicle is stopped at a stop sign). In these situations, fuel is still consumed by the engines even though the vehicles are not moving. Some vehicles address this problem by employing a start-stop system that automatically shuts down and restarts the internal combustion engines under certain operating conditions in which the vehicle remains in idle for extended periods of time to reduce the amount of fuel consumed by the engines. For example, the engine may be shut off when the vehicle is stopped at a stop light, stopped a train crossing, placed in park, no longer performing construction tasks, etc. However, many potential stop situations may result in excessive battery usage or reduced throttle response. Accordingly, the engine control units ("ECUs") can be configured to identify appropriate situations to activate the start-stop system, when to disable the start-stop system, and when to activate a stopped engine during a start-stop cycle.

However, some engines are used to provide power to other components, such as secondary systems and accessories of the vehicle. For example, the internal combustion engine of a construction vehicle may be used to provide power to the wheels (i.e., to propel the vehicle), to a hydraulic system to operate a construction device (e.g., a shovel, a crane, a blade, etc.), to an air conditioning unit, and the like. The internal combustion engine may be manufactured separately from the vehicle, and the ECU may not be specifically programmed for the construction vehicle. Further, other engines, particularly hybrid engines (e.g., diesel-electric, diesel-hydraulic, etc.) have a multitude of original equipment manufacturer ("OEM") supplied components from various OEMs. The OEMs include secondary system providers, accessory providers, vehicle integrators, vehicle customizers, equipment providers, and the like. Accordingly, the ECU of the internal combustion engine may not have the proper programming to account for various systems driven by the internal combustion engine and the components of the engine supplied by other OEMs when making start-stop decisions. Allowing the OEM system controllers to communicate directly with the ECU can result in architectural challenges, such as performance degradation due to increased data latency. Further, embedding a mixture of controller software from multiple OEMs into a single control module potentially exposes each OEM's proprietary software and programming logic to other OEMs involved with the vehicle and/or internal combustion engine. It would be desirable to allow OEMs to contribute to stop-start control without causing performance degradation and without revealing potentially proprietary software and programming logic to other OEMs.

SUMMARY

Various embodiments relate to an internal combustion engine control system including a start-stop feature that automatically stops the internal combustion engine to conserve fuel. The system includes an internal combustion engine that drives a vehicle and provides power to other components of the vehicle. The system further includes an ECU configured to control the operation of the internal combustion engine. The ECU includes a processor, memory, a start-stop control module, and an OEM hardware interface. The start-stop control module includes programming and circuitry to allow the ECU to implement the start-stop feature that stops the internal combustion engine during periods of expected extended idling to conserve fuel. The OEM hardware interface allows the ECU to send and receive signals with the other components of the vehicle such that the other components can provide input into the start-stop control module to affect when the internal combustion engine is stopped and restarted.

These and other features, together with the organization and manner of operation thereof, will become apparent from the following detailed description when taken in conjunction with the accompanying drawings.

DETAILED DESCRIPTION

Referring to the figures generally, a smart start-stop system for a vehicle is described. The vehicle is powered by an internal combustion engine (e.g., a diesel engine, a gas engine, a hydrogen engine, etc.). An engine control unit ("ECU") controls the operation of the internal combustion engine. The ECU includes a start-stop feature that stops the internal combustion engine during periods of expected extended idling to conserve fuel. The periods of expected extended idling may include, for example, while the vehicle is stopped at a stop light, while the vehicle is not being used for a specific construction task, while the vehicle is stopped at a railroad crossing, while the vehicle is in line at a drive thru, and the like. The ECU includes an original equipment manufacturer ("OEM") interface that allows OEM supplied components to provide input into the start-stop decisions of the ECU. The OEM supplied components are other components of the vehicle not necessarily provided by the engine manufacturer. The other components may include, for example, secondary systems powered by the internal combustion engine or battery system (e.g., hydraulic construction equipment), driver equipment powered by the internal combustion engine or battery system (e.g., displays, HVAC equipment, etc.), and accessories powered by the internal combustion engine or battery system (e.g., radio, lights, speakers, displays, cameras, etc.). The OEM supplied systems may include a separate OEM system controller that is different than the ECU. The separate OEM system controller is in communication with the ECU via the OEM interface. The OEM supplied systems may rely on the internal combustion engine for operational power (e.g., construction devices) or may work with the internal combustion engine to power the vehicle (e.g., hybrid engine systems). As used herein, an OEM can include any of include secondary system providers (e.g., hydraulic construction system providers), accessory providers (HVAC accessory providers, lighting accessory providers, etc.), vehicle integrators, vehicle customizers, equipment providers, and the like.

Figure 1:
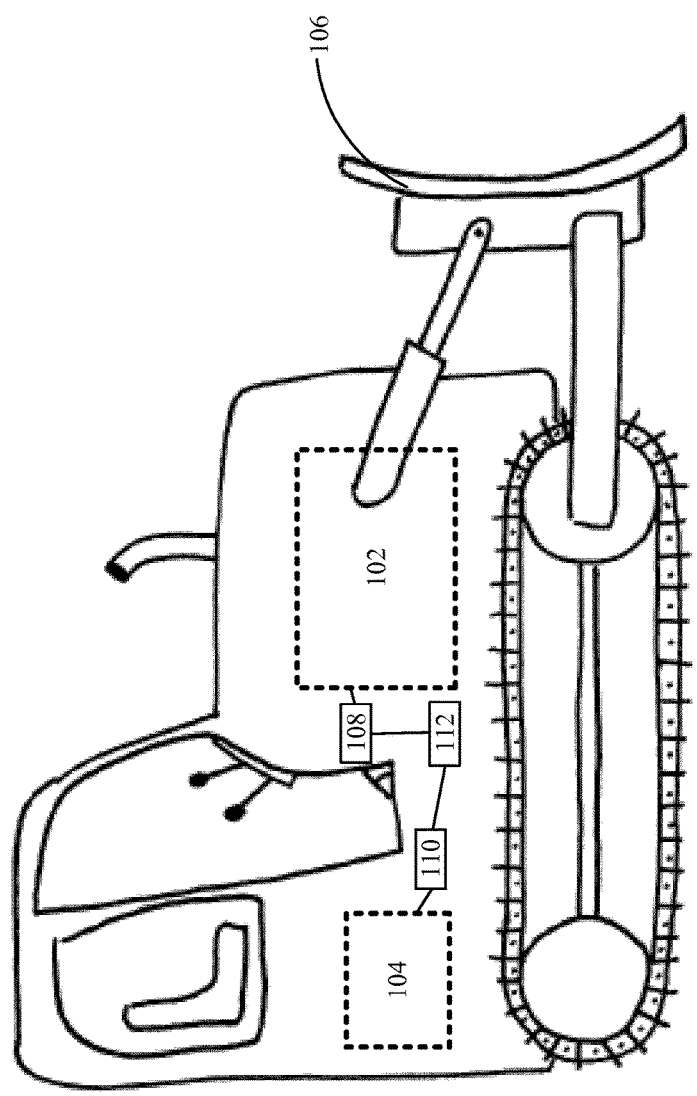
FIG. 1 is a schematic view of a construction vehicle according to an example embodiment.

Referring to FIG. 1, a schematic view of a construction vehicle 100 is shown according to an example embodiment. The construction vehicle 100 is powered by an internal combustion engine 102. The internal combustion engine 102 propels the construction vehicle 100. The internal combustion engine 102 also provides power to a hydraulic motor 104. The hydraulic motor 104 provides power to a construction device 106 (shown as a bulldozer blade). The internal combustion engine 102 is controlled by an ECU 108. Accordingly, the ECU 108 includes a controller. In certain embodiments, the ECU 108 is structured to perform certain operations. In certain embodiments, the ECU 108 forms a portion of a processing subsystem including one or more computing devices having memory, processing, and communication hardware. The ECU 108 may be a single device or a distributed device, and the functions of the ECU 108 may be performed by hardware and/or as computer instructions on a non-transient computer readable storage medium. In certain embodiments, the ECU 108 includes one or more modules structured to functionally execute the operations of the ECU 108. The description herein including modules emphasizes the structural independence of the aspects of the ECU 108, and illustrates one grouping of operations and responsibilities of the ECU 108. Other groupings that execute similar overall operations are understood within the scope of the present application. Modules may be implemented in hardware and/or as computer instructions on a non-transient computer readable storage medium, and modules may be distributed across various hardware or computer based components.

The ECU 108 also controls a start-stop feature of the internal combustion engine 102. The start-stop feature selectively stops the internal combustion engine 102 during extended periods of idling to conserve fuel. The hydraulic motor 104 is controlled by a hydraulic motor controller 110. In some situations, the hydraulic motor controller 110 may require power from the internal combustion engine 102 in situations in which the ECU 108 sends a stop signal to the internal combustion engine 102 to conserve fuel. Accordingly, the hydraulic motor controller 110 communicates with an OEM interface 112 of the ECU 108 to provide input and start-stop blocking signals to the ECU 108.

Figure 2:
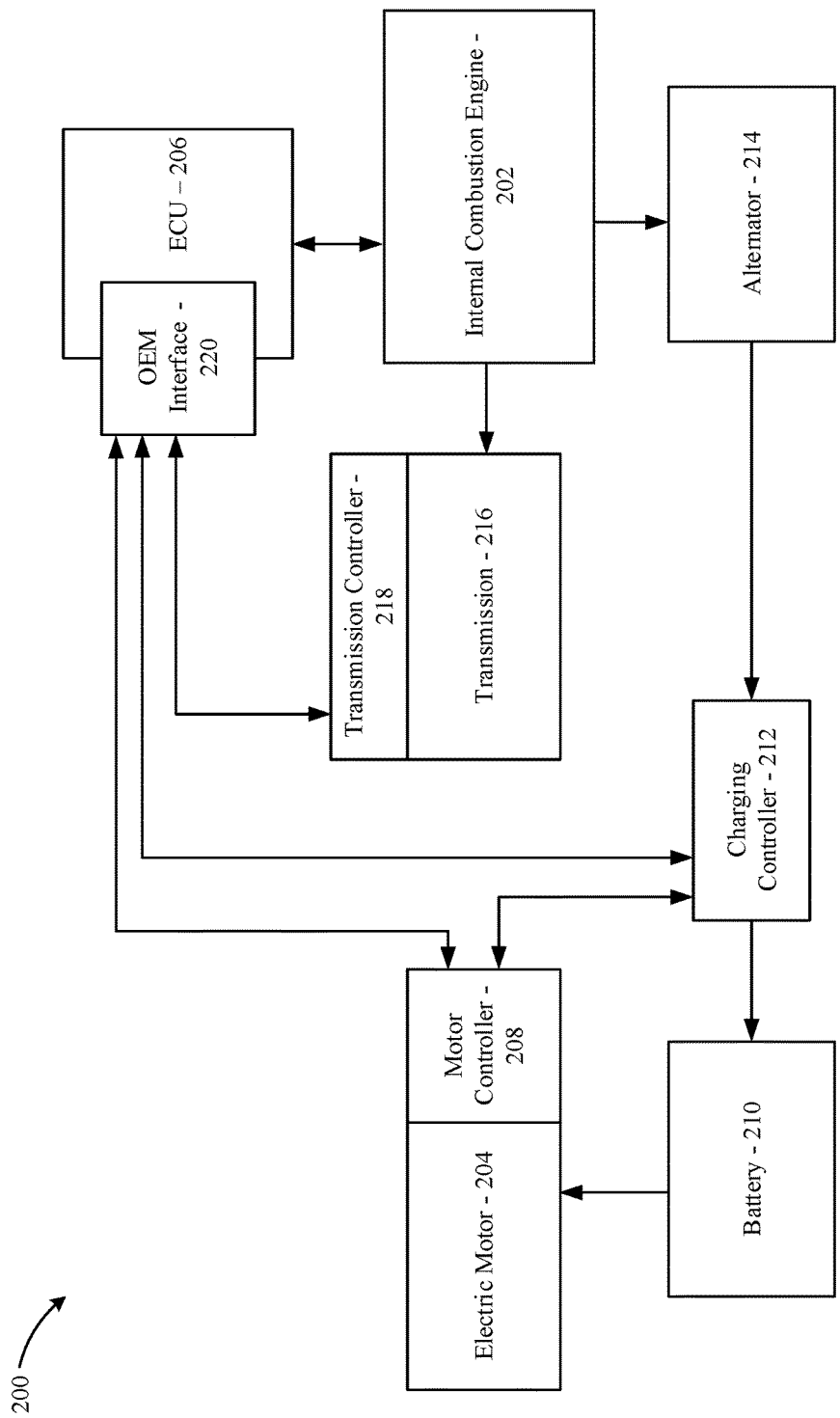
FIG. 2 is a block diagram of a hybrid powertrain according to an example embodiment.

Referring to FIG. 2, a block diagram of a hybrid powertrain 200 is shown according to an example embodiment. The hybrid powertrain 200 may be used to propel a vehicle and/or to power accessories mounted on the vehicle (e.g., a construction device). The hybrid powertrain 200 is powered by an internal combustion engine 202 and at least one electric motor 204. The internal combustion engine 202 is controlled by an ECU 206. The ECU 206 includes the same or similar structure as described above with respect to the ECU 108. The ECU 206 also controls a start-stop feature of the internal combustion engine 202. The start-stop feature selectively stops the internal combustion engine 202 during extended periods of idling to conserve fuel. The electric motor 204 is controlled by a motor controller 208. The electric motor 204 is powered by at least one battery 210. The battery 210 is a rechargeable battery. The charging of the battery 210 is controlled by a charging controller 212. The battery 210 is charged based on electric power generated by an alternator 214 driven by the internal combustion engine 202 and based on kinetic energy capture from the electric motor 204 (e.g., via regenerative braking). The internal combustion engine 202 drives the vehicle or equipment via a transmission 216. In some arrangements, the electric motor 204 also drives the vehicle or equipment via the transmission 216. In other arrangements, the electric motor 204 directly drives the vehicle or equipment. The transmission 216 may have a transmission controller 218, which controls gear selection within the transmission 216.

As discussed above, the ECU 206 controls a start-stop feature of the internal combustion engine 202. In some situations, the ECU 206 would normally issue a stop command (e.g., after the internal combustion engine 202 has been idling), and the stoppage of the internal combustion engine 202 would negatively affect the other components of the hybrid powertrain 200. For example, in certain situations, the ECU 206 may issue a stop command if no stop-override command is received when the battery 210 needs charging from the alternator 214. Accordingly, the various controllers from other OEM systems, such as the motor controller 208, the charging controller 212, and the transmission controller 218, can communicate data with the ECU 206 via an OEM interface 220 of the ECU 206.

Communication between OEM systems and an ECU (e.g., ECU 108, ECU 106, etc.) of an internal combustion engine via OEM interfaces (e.g., OEM interface 112, OEM interface 220, etc.) are described in further detail below with respect to a start-stop system provided by the ECU.

Figure 3:
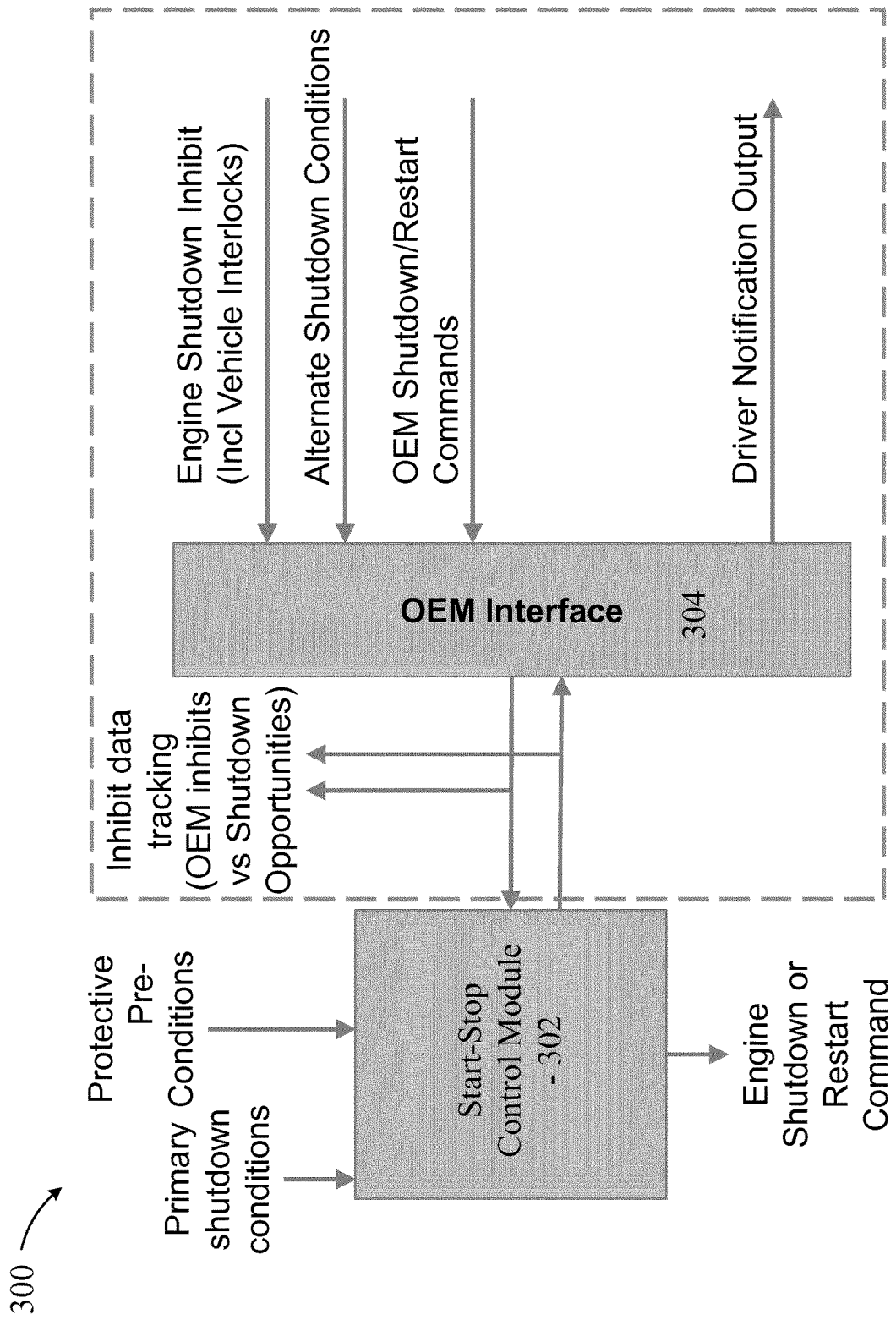
FIG. 3 is a schematic diagram of an ECU according to an example embodiment.

Referring to FIG. 3, a schematic diagram of an ECU 300 according to an example embodiment. The ECU 300 controls the operation of an internal combustion engine. The ECU 300 includes a start-stop control module 302. The start-stop control module 302 provides the programming and circuitry necessary for the ECU 300 to provide a start-stop feature that stops the internal combustion engine during periods of expected extended idling to conserve fuel. The ECU 300 can implement the start-stop feature based on predicting an extended idling by the engine period by monitoring usage characteristics (e.g., engine speed, vehicle speed, transmission positions, operator input, steering position, brake pedal position, hydraulic joystick position and pressure, construction equipment positioning and movement, etc.) of the internal combustion engine or the vehicle powered by the internal combustion engine.

The ECU 300 includes an OEM interface 304. The OEM interface 304 includes inputs to the start-stop control module 302 that are used by the start-stop control module 302 in making determinations as to whether to stop the internal combustion engine to save fuel and as to whether to restart the internal combustion engine after the engine has been stopped. For example, through the OEM interface 304, the start-stop control module 302 may receive data from battery sensors, vehicle sensors (e.g., speed, transmission gear selection, fuel levels, accessory power requirements, etc.), driver input, steering wheel position, brake pedal position, hydraulic joystick position and pressure, construction equipment positioning, and the like. Additionally, the OEM interface 304 allows the start-stop control module 302 to receive signals from other systems that may be installed on the vehicle powered by the internal combustion engine. For example, the OEM interface 304 allows the start-stop control module 302 to receive signals from systems manufactured by a different manufacturers than the internal combustion engine manufacturer. These systems manufactured by the different manufactures may include, for example, hydraulic systems, construction equipment (e.g., forklift booms, shovels, bucket position, conveyors, etc.), and the like.

The signals received from other systems may permit controllers of the other systems to override potential start-stop commands from or to influence start-stop decisions made by the ECU 300 via the start-stop control module 302 without introducing data latency that can cause performance degradation. The signals may relate to engine shutdown inhibit signals (i.e., signals that prevent the internal combustion engine from being stopped), alternate shutdown condition signals, OEM shutdown/restart command signals, and the like. For example, a signal from a vehicle's steering wheel that indicates the position of the steering wheel is changing may indicate an operator intent to move the vehicle. The determination that the steering wheel is moving may be interpreted as a start-stop inhibit signal or a start signal (if the engine is stopped). As another example, The ECU 300 may monitor a signal indicating a position of an implement (e.g., bucket, fork, etc.) powered by the engine. If the position signal indicates that the implement is in use or about to be used, the signal can prevent engine stopping or trigger the starting of an already stopped engine. The OEM interface 304 may also send signals from the ECU 300 to the OEM systems. The output signals may relate to drive notification signals sent to a driver notification system (e.g., a dashboard indicator, a dashboard display, a mobile device in communication with the OEM interface 304, etc.).

Figure 4:
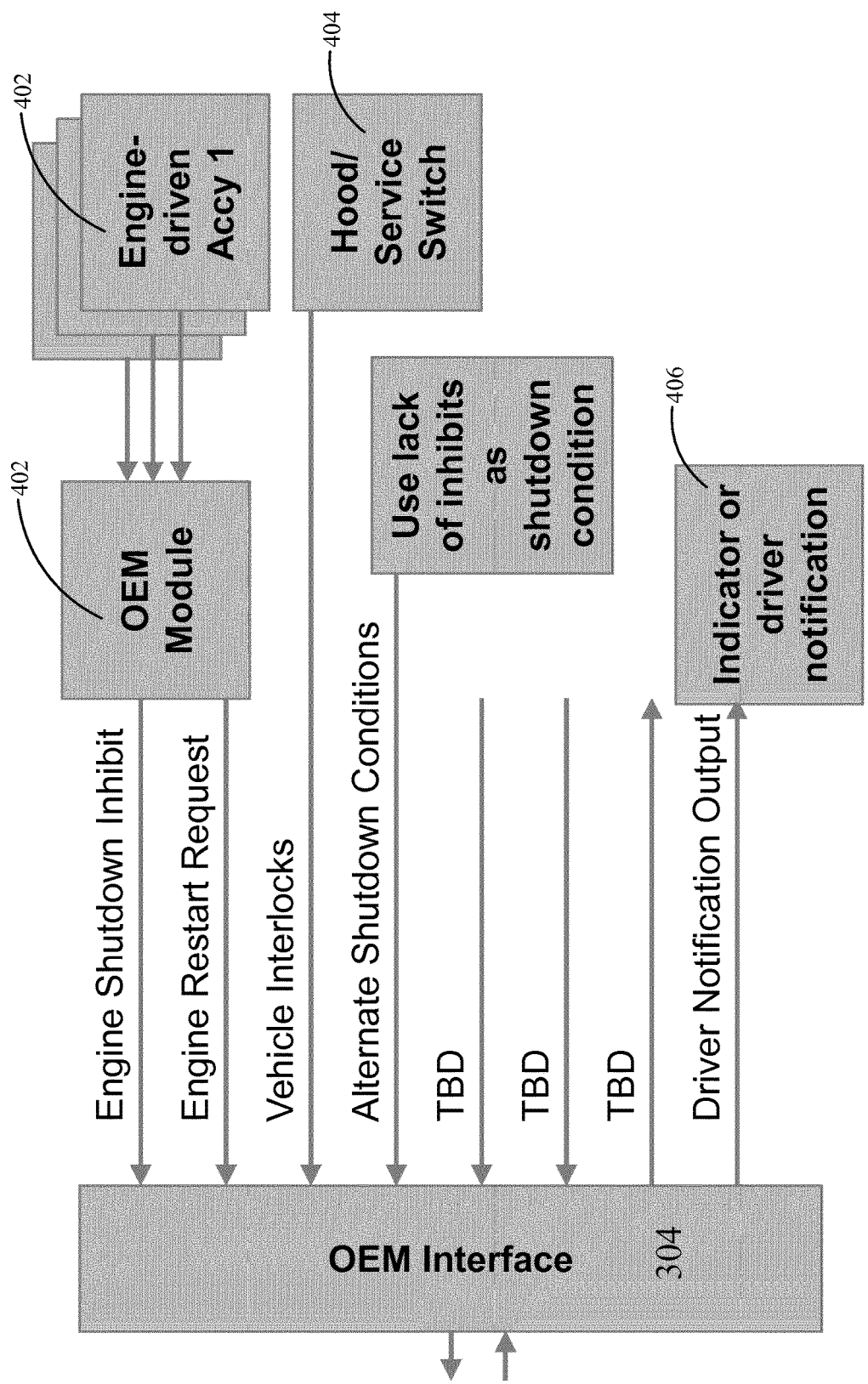
FIG. 4 is a schematic diagram of how an OEM interface of the ECU of FIG. 3 interfaces with the various systems of the vehicle.

Referring to FIG. 4, a schematic diagram of how the OEM interface 304 interfaces with the various systems of the vehicle is shown according to an example embodiment. In some arrangements, the OEM interface 304 receives signals from an OEM control module 402 (e.g., controller 110) associated with an engine driven accessory 404 (e.g., the hydraulic motor 104). In some arrangements, there is a plurality of different OEM control modules 402 associated with a plurality of engine driven accessories 404. The plurality of OEM control modules may be from a plurality of different OEMs. The signals received from the OEM control modules 402 may relate to engine shut down inhibit signals and engine restart request signals. In some situations, a lack of an engine shutdown inhibit signal from any of the coupled OEM control modules 402 may signal to the start-stop control module 302 an engine shutdown condition. In further arrangements, the OEM interface 304 receives signals from switches and sensors (e.g., a hood/service switch 404) positioned on the vehicle. The signals from the various switches and sensors may relate to vehicle interlock signals.

In some arrangements, the OEM interface 304 receives input from a driver input module or an equipment operator module configured to provide feedback signals to the ECU 300 via the OEM interface 304 relating to positions and pressures of driver or operator control devices. The driver or operator control feedback signals may include, for example, a brake pedal position indicator, a hydraulic joystick position indicator, a hydraulic joystick pressure indicator, a steering wheel position indicator, a transmission position indicator, or the like. The feedback signals may be analog or digital electrical signals. In some arrangements, the feedback signals are generated by pressure sensors installed within hydraulic lines of the hydraulically powered equipment controlled by the driver or operator. The driver or operator control feedback signals can be used to start a stopped engine (e.g., if the operator moves a joystick and the engine is stopped) or serve as an inhibit signal to prevent the engine from being stopped.

The OEM interface 304 can send signals to an indicator or driver notification 406. The indicator or driver notification 406 may include a dashboard light, a display screen, an alarm, or the like. The OEM interface 304 may include additional data ports that are not initially used to allow for future equipment that may be added to the vehicle to communicate with the engine's ECU 300.

Figure 5:
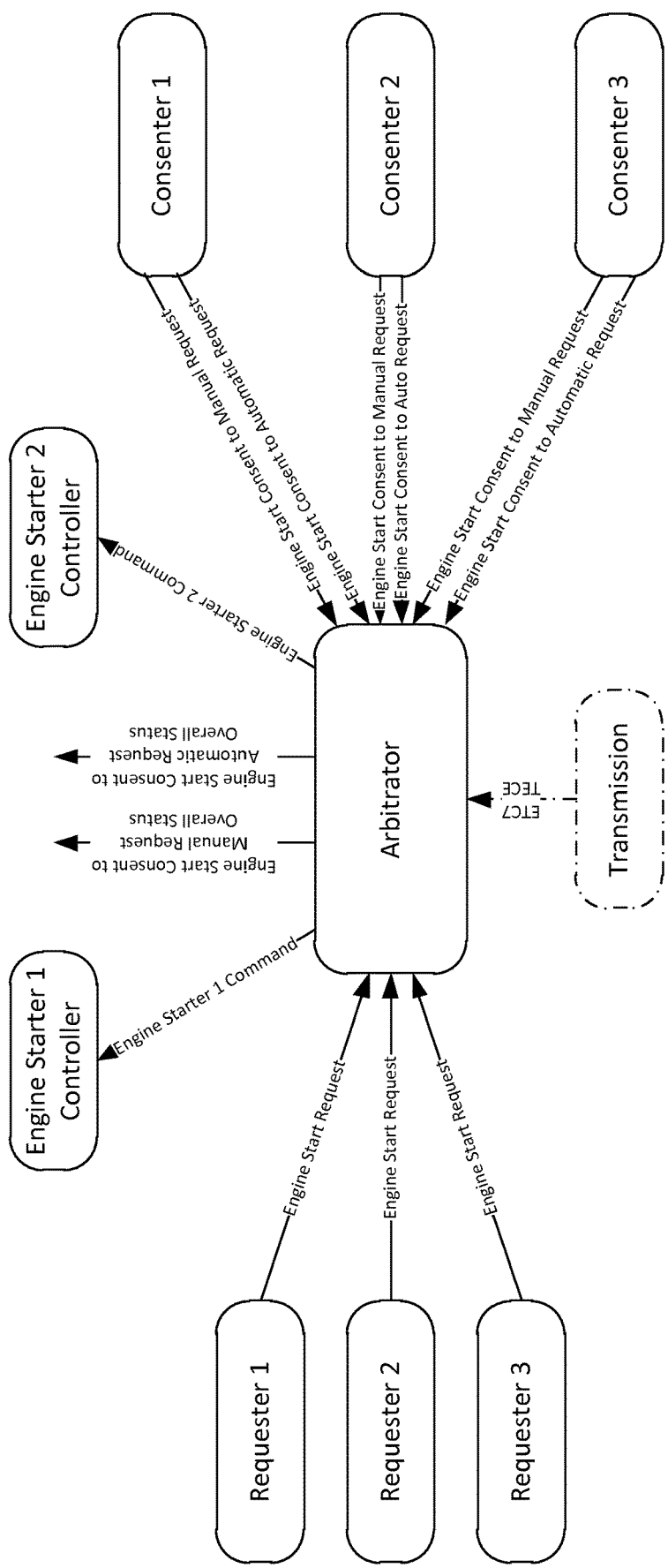
FIG. 5 is a schematic view of an example J1939 bus system for use with a start-stop system.

The signals sent to and from the OEM interface 304 may be sent via the Society of Automotive Engineers ("SAE") J1939 vehicle bus system. A schematic view of an example J1939 bus system for use with a start-stop system (e.g., as described above) is shown in FIG. 5.

Figure 6:
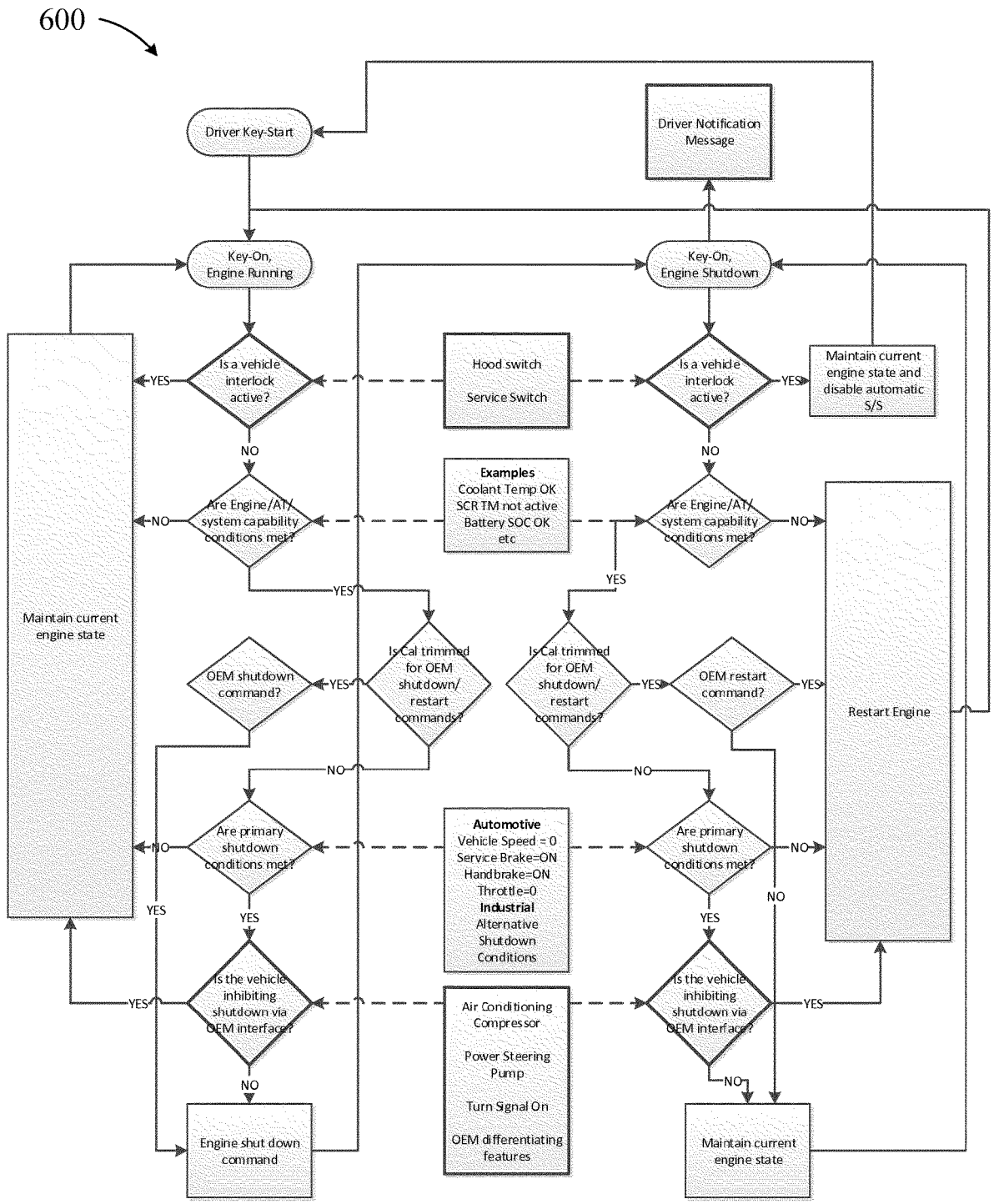
FIG. 6 is a flow chart of a method of providing a start-stop system via an ECU of an internal combustion engine is shown according to an example embodiment.

Referring to FIG. 6, a flow chart of a method 600 of providing a start-stop system via an ECU (e.g., ECU 108, ECU 206, ECU 300, etc.) for an internal combustion engine is shown according to an example embodiment. Method 600 is performed by the ECU. The ECU has an OEM interface, such as OEM interface 304 as described above. Method 600 details when a running internal combustion engine may be stopped by the start-stop system to conserve fuel, and when a stopped internal combustion should be restarted based on internal logic of the ECU and signals received from external devices (e.g., systems manufactured by a different manufacturer than the internal combustion engine manufacturer as described above with respect to FIGS. 1-5).

In some situations, the internal combustion engine controlled by the above-described ECU 300 is part of a hybrid drivetrain (e.g., diesel-electric, diesel-hydraulic, etc.). In such arrangements, the basic design of the OEM interface 304 allows an external control module to provide, via digital communications, desired power split (e.g., between the internal combustion engine and the secondary engine or motor) in the form of either percentage allocations or absolute values. The percentages are not necessarily based on the exact and instantaneous total power demand; therefore, the external control is not inserted in the prime mover control loop and does not introduce and data latency to the control.

Figure 7:
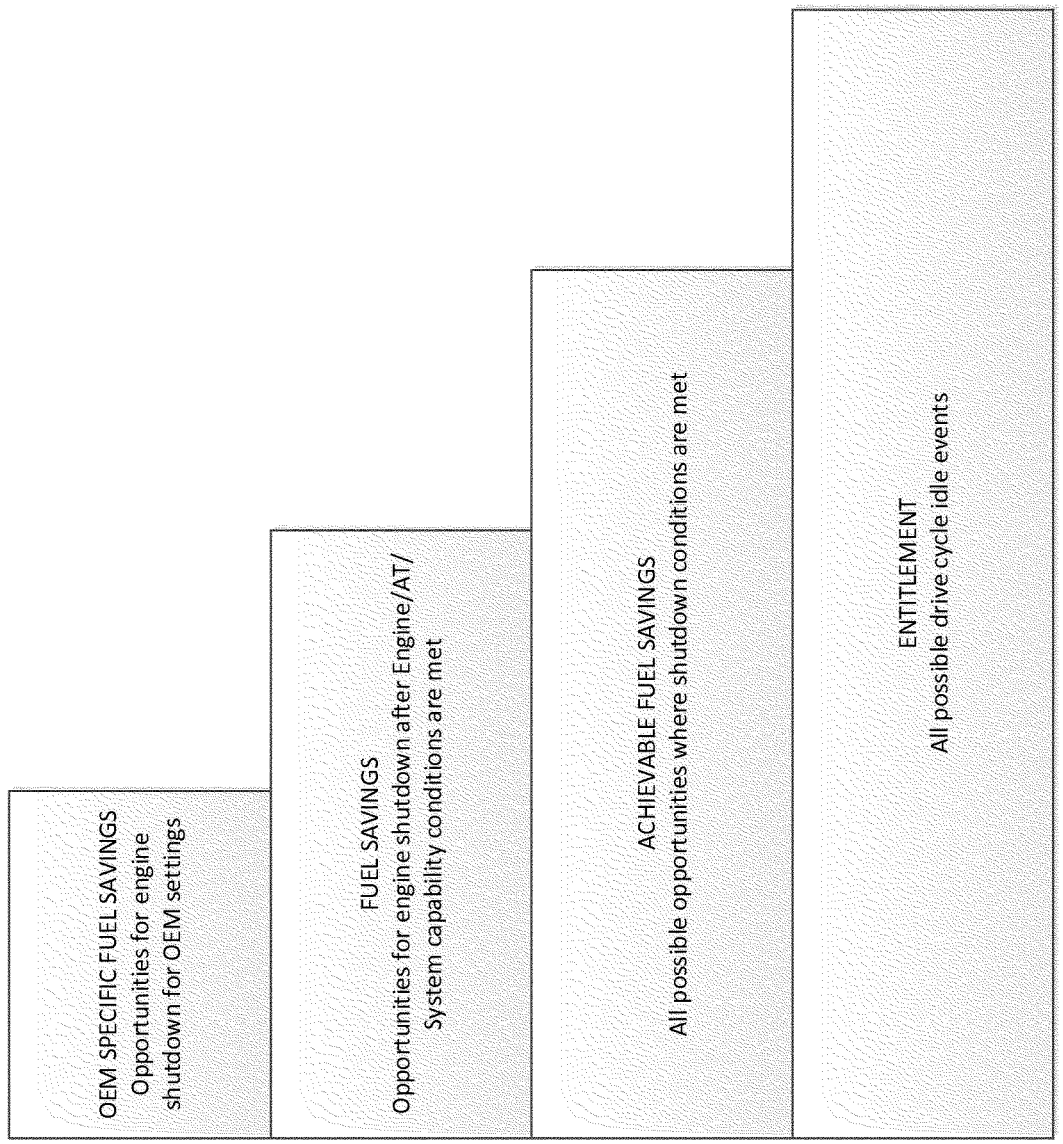
FIG. 7 is a bar graph representation of fuel savings is shown according to an example.

Referring to FIG. 7, a bar graph representation 700 of fuel savings is shown according to an example. The bar graph representation 700 demonstrates the various amounts of fuel savings possible through the use of the above-described start-stop systems. As shown in the representation 700, the most amount of fuel savings occur when all possible drive cycle idle events are eliminated ("Entitlement"). However, the Entitlement savings are not realistically possible because not all idle conditions are appropriate for stopping of the engine (i.e., not every idle situation corresponds to a shutdown condition). The next highest amount of fuel savings is what would happen if all possible opportunities where the engine is shut down for all shutdown conditions ("Achievable Fuel Savings"). However, the Achievable Fuel Savings estimate does not account for the fact that the internal combustion engine is used to power accessories and other components of the vehicle (e.g., a hydraulic system, a battery charger for a hybrid drivetrain, etc.). The lowest amount of fuel savings occurs when the internal combustion engine is shutdown only when the external OEM controllers indicate a shutdown condition ("OEM Specific Fuel Savings"). However, the OEM Specific Fuel Savings scenario does not necessarily optimize fuel savings with actual equipment usage. For example, there may be times when certain OEM systems are idle and are not being used, but the OEM systems do not provide a shutdown signal to the ECU. The actual fuel savings are demonstrated when opportunities for engine shutdown after the engine, automatic transmission, and system capability conditions are met ("Fuel Savings").

Accordingly, the ECU is programmed to provide an interface for each OEM system to provide input into the start-stop functionality to customize the performance of the system in a given application for customer requirements. For example, if an OEM customer wants the air conditioning ("A/C") of a vehicle to be unaffected by the start-stop system, at the expense of fuel savings, the interface allows that OEM to override engine shutdown. Or, alternatively, that OEM can decide to run an electric A/C during engine off conditions (e.g., based on a battery charge level) and not inhibit the engine shutdown for an optimized solution for that OEM. On the other hand, another OEM may determine that its customers are more concerned with fuel savings than operator comfort, and would simply not provide an override or inhibit if A/C is running. The interface thereby allows OEM differentiation with the exact same engine start-stop system.

In some arrangements, ECU 300 includes a logging module structured to maintain a log start-stop events, where the engine is temporarily shut down to conserve fuel before being restarted, and canceled start-stop events, where primary start-stop conditions are met but a potential start-stop event is not implemented. Each entry in the log includes a time (e.g., a date, a time, etc.) and a description of the logged event. The description includes the OEM signals received via the OEM interface 302 at the time of the start-stop event or at the time of the potential start-stop event that is not implemented (e.g., because of a start-stop inhibit signal received from an OEM system). The log may be retrieved by a technician and provides insight useful for service diagnostics or for warranty claims relating to unexpectedly high fuel consumption claims.

The above-described interface allows implementation of a start-stop system in which the engine manufacturer is not involved in the manufacturing of the piece of equipment powered by the engine. For example, construction equipment is often powered by an internal combustion engine manufactured by a third-party that is different than the construction equipment manufacturer. In these situations, the construction equipment manufacturer (along with any individual component manufacturers) can provide use-specific and customer-specific start-stop signal input into the internal combustion engine ECU for a given application (e.g., a fork lift, an excavator, etc.) that factor into the ECU's decision to implement a start-stop feature. The ECU can maximize the fuel savings by shutting the engine off as often as possible without affecting the operation of the equipment because the OEM can provide OEM start-stop inhibits and limitations to the ECU for a given piece of equipment powered by the engine. The high level of customization of the described start-stop systems also permits the OEM or machine builder to install the start-stop system in one-off applications without investing much time or money in developing individual start-stop systems for custom machinery.

Figure 8A:
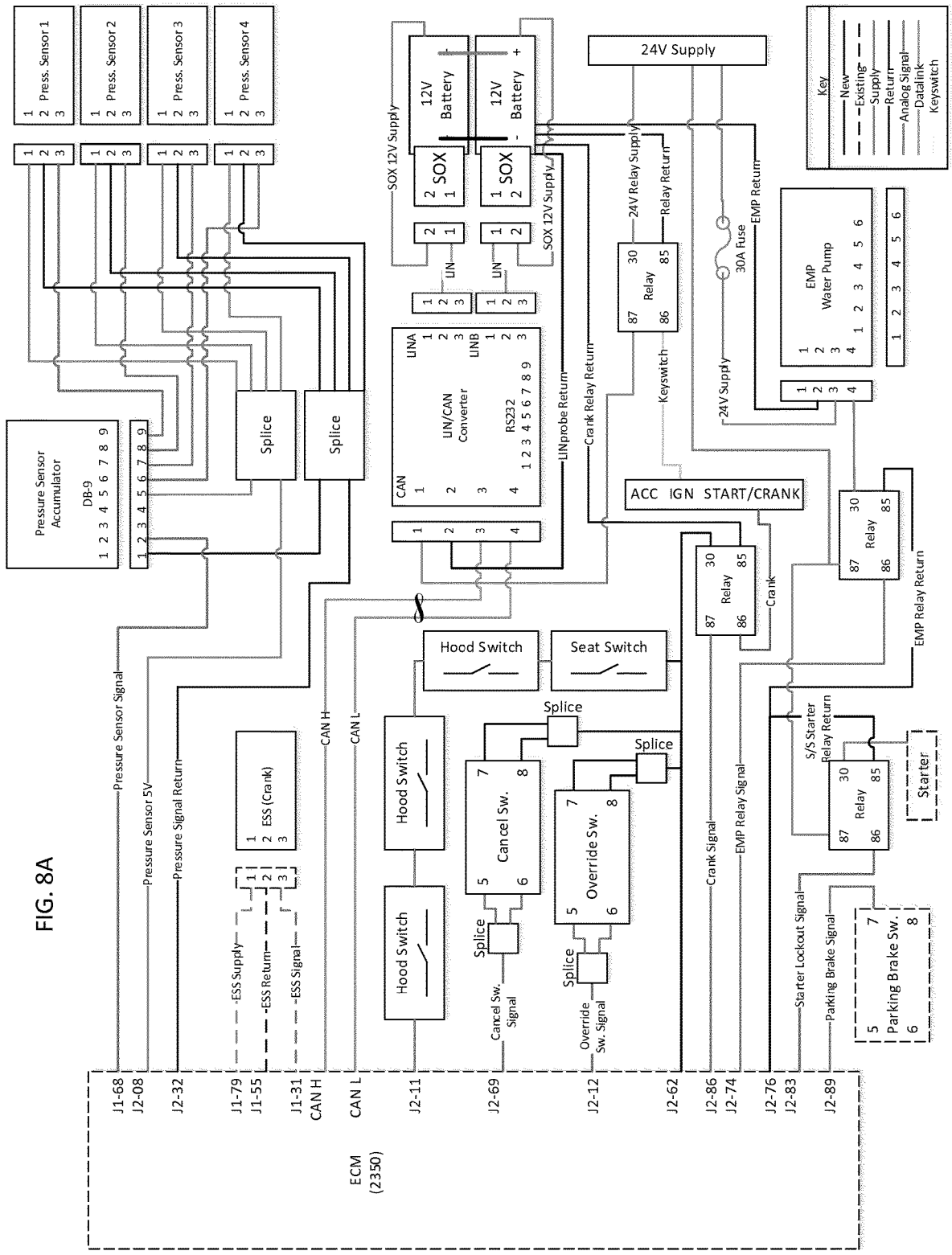
FIGS. 8A and 8B are circuit diagrams of a start-stop system according to an example embodiment
Figure 8B:
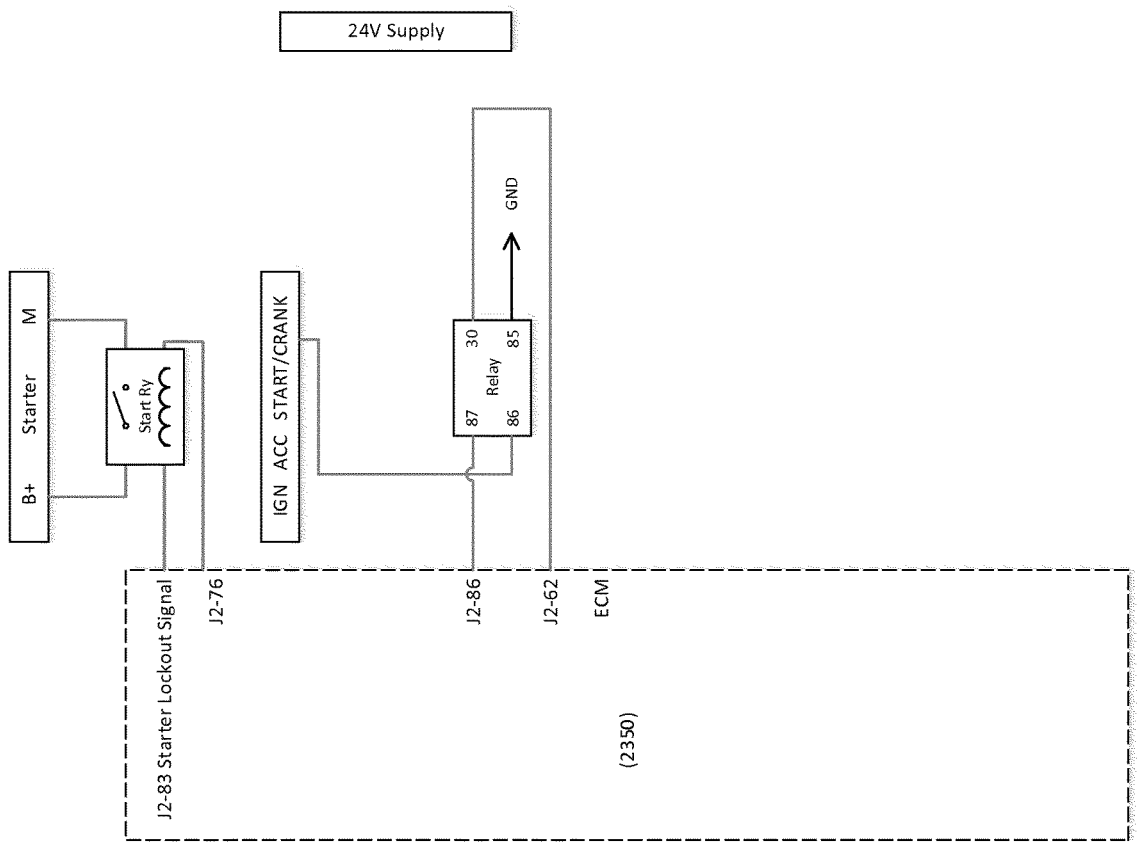

Referring to FIGS. 8A and 8B, circuit diagrams of a start-stop system are shown according to an example embodiment. The circuit diagram of FIGS. 8A and 8B show a specific implementation of the above-described start-stop system.

Figure 9:
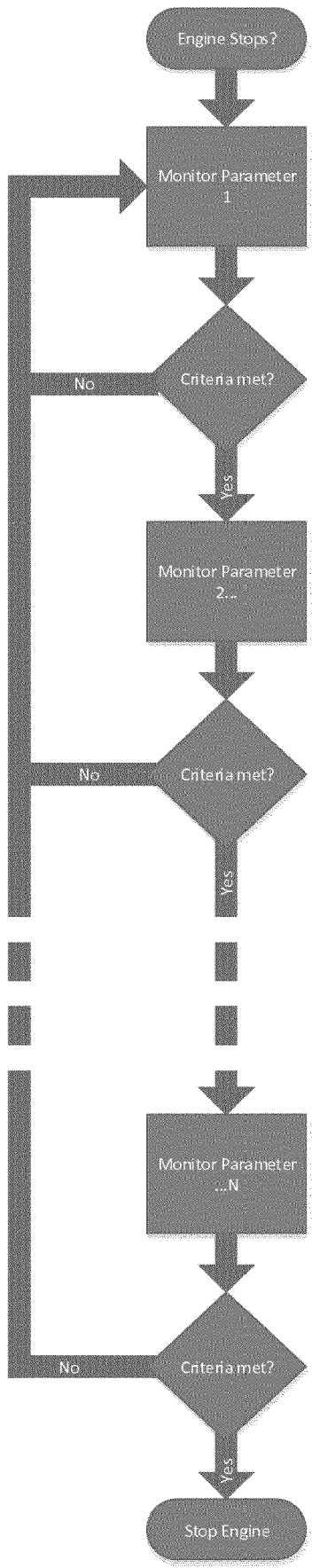
FIGS. 9 and 10 are flow diagrams of methods of stopping an engine and starting an engine according to an example embodiment.
Figure 10:
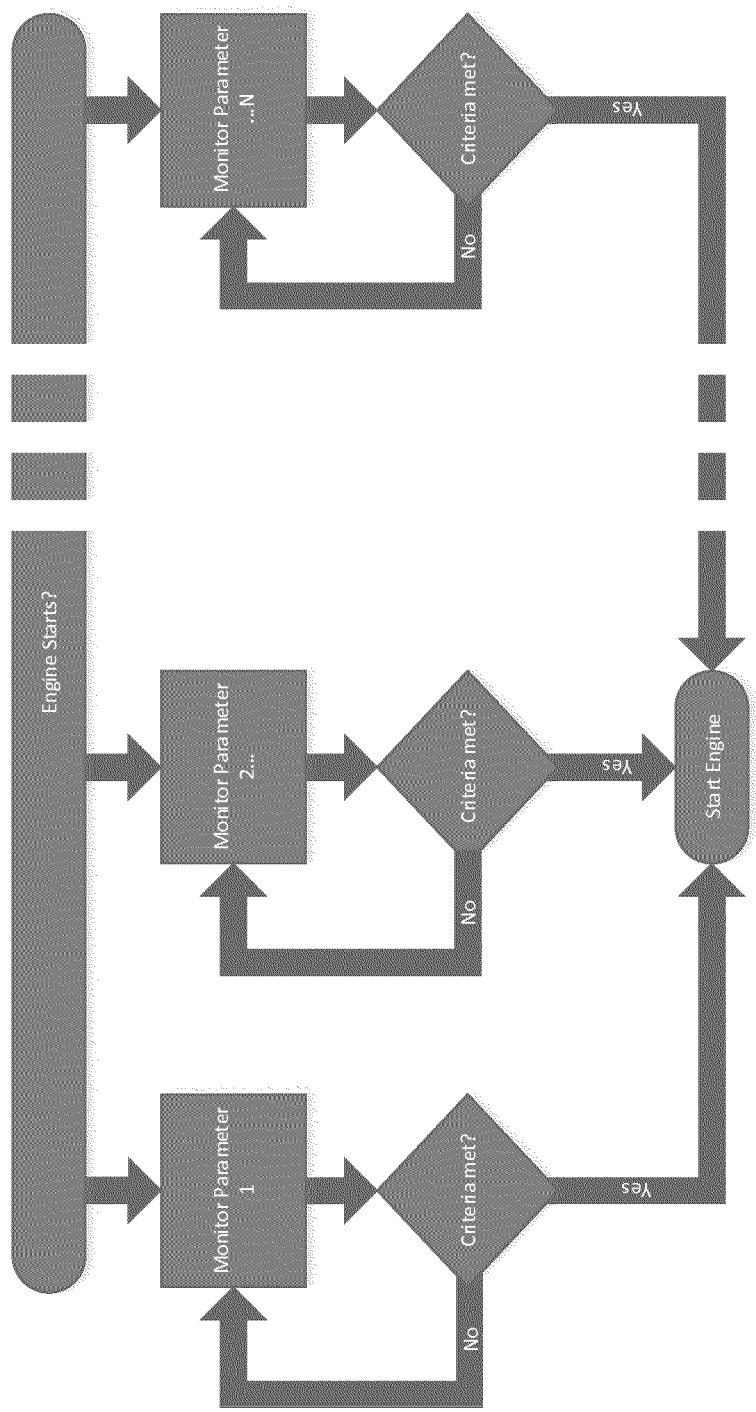

Referring to FIG. 9, a flow diagram of a method of determining when an engine should be stopped based on a start stop feature is shown according to an example embodiment. The method of FIG. 9 is performed by an ECU, such as ECU 300. Referring to FIG. 10, a flow diagram of a method of determining when a stopped engine should be restarted is shown according to an example embodiment. The method of FIG. 10 is performed by an ECU, such as ECU 300. The methods of FIGS. 9 and 10 describe the operation of a start-stop system, such as the systems described above. When implementing the described methods, the ECU monitors operator input sensors, machine functions, machine operating parameters, environmental conditions, and detected operator intents of a vehicle (e.g., an off-road vehicle) to implement the engine start-stop feature. The inputs may include any of steering control pressure/position, joystick control pressure/position, altitude, PTO rotation speed, remote throttle position, A/C compressor pressure, parking brake position, FNR Lever Position, duty cycle, seat position, fluid Pressure, fluid temperature, implement position, implement load, air pressure, ambient air temperature, incline, date, cabin temperature, light, air quality, fluid level and fluid flow in order to detect operator/machine/system intent. Generally, the engine is stopped when operator input sensors indicate a sustained lack of activity, and the engine is restarted when any operator input is excited or activated. Example monitoring criteria are described in further detail below.

In implementing the start-stop feature, the ECU monitors the steering control pressure, which when the steering is manipulated the pressure will be measured in order to detect operator intent. Sustained low steering control pressure indicates non-use, and the engine may be stopped by the ECU. Any significant increase in pressure would trigger an engine restart or a start-stop inhibit signal to the ECU.

In implementing the start-stop feature, the ECU monitors the steering control position (e.g., position of a steering wheel or lever), which when the steering is manipulated the position will be measured in order to detect operator intent. Sustained lack of movement indicates non-use, and the engine may be stopped by the ECU. Any significant change in position would trigger an engine restart or a start-stop inhibit signal to the ECU.

In implementing the start-stop feature, the ECU monitors the joystick control pressure of a joystick used to control a piece of equipment powered by the engine, which when the joystick is manipulated the pressure will be measured in order to detect operator intent. Sustained low pressure indicates non-use, and the engine may be stopped by the ECU. Any significant increase in pressure would trigger an engine restart or a start-stop inhibit signal to the ECU.

In implementing the start-stop feature, the ECU monitors the joystick control position, which when the joystick is manipulated the position will be measured in order to detect operator intent. Sustained lack of movement indicates non-use, and the engine may be stopped. Any significant change in position would trigger an engine restart or a start-stop inhibit signal to the ECU.

In implementing the start-stop feature, the ECU monitors the altitude, in order to determine operational conditions for start-stop status. Operating in high altitude may inhibit the automated start-stop function due to lower air density.

In implementing the start-stop feature, the ECU monitors the power takeoff ("PTO") rotation speed for various components powered by the engine. When the PTO is manipulated the speed will be measured in order to detect operator intent. Sustained lack of rotation indicates nonuse, and the engine may be stopped by the ECU. Sustained rotation speed indicates use, which serves as a start-stop inhibit signal such that the engine cannot be stopped.

In implementing the start-stop feature, the ECU monitors the remote throttle position, which when the remote is manipulated the position will be measured in order to detect operator intent. Sustained lack of movement indicates non-use, and the engine may be stopped by the ECU. Any significant change in position would trigger an engine restart or a start-stop inhibit signal to the ECU.

In implementing the start-stop feature, the ECU monitors the A/C compressor pressure, in order to determine operational conditions for start/stop status. Sustained low pressure indicates non-use, and the engine may be stopped by the ECU. Any significant increase in pressure would trigger an engine restart or a start-stop inhibit signal to the ECU.

In implementing the start-stop feature, the ECU monitors the parking brake position, which when the parking is manipulated the position will be measured in order to detect operator intent. Sustained application of the parking brake informs the ECU that the engine may be stopped. Release of the parking brake would trigger an engine restart or a start-stop inhibit signal to the ECU.

In implementing the start-stop feature, the ECU monitors the position of the transmission lever (e.g., forward, neutral, reverse or "FNR" lever position), which when the FNR lever is manipulated the position will be measured in order to detect operator intent. Sustained lack of movement indicates non-use, and the engine may be stopped by the ECU. Any significant change in position would trigger an engine restart or a start-stop inhibit signal to the ECU.

In implementing the start-stop feature, the ECU monitors the duty cycle, in order to determine operational conditions for start-stop status. Duty cycle is determined by monitoring frequency of start-stop events. The duty cycle could be used to increase engine shut down delay or inhibit the start-stop function for a period of time in order to achieve a target number of start-stop events.

In implementing the start-stop feature, the ECU monitors the seat position, which when the seat is manipulated the position will be measured in order to detect operator presence. If an operator is not present, the start-stop function will remain in current state (either engine stopped or engine on).

In implementing the start-stop feature, the ECU monitors the fluid pressure (e.g., hydraulic fluid pressure, oil pressure, fuel pressure, etc.), which when the fluid is manipulated the pressure will be measured in order to detect operator intent. Sustained high or low fluid pressure indicates non-use, and the engine may be stopped by the ECU. Any significant change in fluid pressure would trigger an engine restart or a start-stop inhibit signal to the ECU.

In implementing the start-stop feature, the ECU monitors the fluid temperature (e.g., hydraulic fluid temperature, oil temperature, fuel temperature, etc.), which when fluid temperature fluctuates the temperature will be measured in order to determine operational conditions for start-stop status. Sustained high or low fluid temperature indicates non-use, and the engine may be stopped by the ECU. Any significant change in fluid temperature would trigger an engine restart or a start-stop inhibit signal to the ECU.

Not all vehicles or equipment will have each of the above-identified systems to be monitored. For example, a van may not have a hydraulically powered system. Accordingly, the above-described list of features that are monitored by the methods of FIGS. 9 and 10 is not required nor is exhaustive. In implementing the start-stop feature, each of the systems should be in a "may be stopped" arrangement before the ECU stops the engine. If any system requires the power from the engine, the engine should not be stopped except as otherwise described above (e.g., if the A/C is the only system stopping the engine stop situation and the OEM has programmed start-stop system to ignore the A/C requirements). Further, if the engine is stopped, any one system may trigger the restart of the engine.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A system structured to control a start-stop feature for stopping an internal combustion engine during periods of expected extended idling, the system comprising:
    a hardware interface module that allows an engine control unit ("ECU") structured to control operation of the internal combustion engine to send signals to and receive signals from other components of the vehicle powered by the engine such that the other components can provide input into a start-stop control module of the ECU to affect when the internal combustion engine is stopped and restarted, wherein the input comprises an engine shutdown inhibit signal generated based on an operator input to one or more of the other components, the engine shutdown inhibit signal indicative of at least one of an operator intent to steer the vehicle and an implement position signal that indicates that an implement powered by the engine is in use or about to be moved, the engine shutdown inhibit signal structured to prevent the ECU from automatically stopping the internal combustion engine.

2. The system of claim 1, wherein the signals received from the other components relate to engine shutdown inhibit signals and engine restart signals.

3. The system of claim 2, wherein the signals to and from the hardware interface module are sent via a Society of Automotive Engineers J1939 vehicle bus system.

4. The system of claim 1, wherein the hardware interface module is configured to send operator notifications to an operator indicator via a communication module structured to send and receive data to and from the ECU.

5. The system of claim 1, wherein the other components of the vehicle are manufactured by parties other than the manufacturer of the ECU.

6. The system of claim 1, wherein the other components include a steering wheel position sensor that communicates with the ECU via the hardware interface module.

7. The system of claim 1, wherein the other components include an equipment operator module that communicates a position or a movement of the implement powered by the engine to the ECU via the hardware interface module.

8. The system of claim 7, wherein the implement is a bucket or a fork of a construction equipment.

9. The system of claim 1, wherein a joystick control system communicates information relating to a position of a joystick or a hydraulic pressure associated with the joystick with the ECU via the hardware interface module, wherein the joystick controls one or more implements of a construction device.

10. The system of claim 1, wherein the other components of the vehicle includes at least one of a steering control system, a joystick control system, an air conditioning compressor, a parking brake, and a seat position detection system.

11. A system structured to control a start-stop feature for stopping an internal combustion engine during periods of expected extended idling, the system comprising:
    a hardware interface module that allows an engine control unit ("ECU") structured to control operation of the internal combustion engine to send signals to and receive signals from other components of the vehicle such that the other components can provide input into a start-stop control module of the ECU to affect when the internal combustion engine is stopped and restarted, wherein the input comprises an engine shutdown inhibit signal generated based on information indicative of an altitude or a low air density, the engine shutdown inhibit signal structured to prevent the ECU from automatically stopping the internal combustion engine.

12. The system of claim 11, wherein the signals received from other components relate to engine shutdown inhibit signals and engine restart signals.

13. The system of claim 11, wherein the other components of the vehicle are manufactured by parties other than the manufacturer of the ECU.

14. The system of claim 11, wherein the other components of the vehicle includes at least one of a steering control system, a joystick control system, an air conditioning compressor, a parking brake, and a seat position detection system.

15. A method for controlling a start-stop feature for stopping an internal combustion engine during periods of expected extended idling to conserve fuel, the method comprising:
    sending and receiving signals, by a hardware interface module of an engine control unit ("ECU"), to and from other components of a vehicle having the internal combustion engine, the other components of the vehicle powered by the engine, and the ECU being structured to control operation of the internal combustion engine;
    providing, by the hardware interface module, the signals from the other components of the vehicle as an input into a start-stop control module of the ECU for affecting when the internal combustion engine is stopped and restarted;
    receiving, by the hardware interface module, an operator input signal from at least one of the other components of the vehicle, the operator input signal comprising an engine shutdown inhibit signal based on the operator input to one or more of the other components indicative of at least one of an operator intent to steer the vehicle and an implement position signal that indicates that an implement powered by the engine is in use or about to be moved; and preventing, by the start-stop control module, the ECU from automatically stopping the internal combustion engine.

16. The method of claim 15, wherein the signals received from other components relate to engine shutdown inhibit signals and engine restart signals.

17. The method of claim 15, wherein the other components of the vehicle includes at least one of a steering control system, a joystick control system that controls one or more implements of a construction device, an air conditioning compressor, a parking brake, and a seat position detection system.

18. The method of claim 15, wherein the other components of the vehicle are manufactured by parties other than the manufacturer of the ECU.

* * * * *